United States Patent [19]

Brassai et al.

[11] Patent Number: 5,702,320
[45] Date of Patent: Dec. 30, 1997

[54] PLANET GEAR CARRIER ARRANGEMENT WITH AXIAL SUPPORT

[75] Inventors: Zoltan Brassai; Bjoern Schneider, both of Cologne; Vladimir Premiski, Zuelpich-Buervenich, all of Germany

[73] Assignee: Ford Global Technologies, Inc., Dearborn, Mich.

[21] Appl. No.: 717,060

[22] Filed: Sep. 20, 1996

[30] Foreign Application Priority Data

Sep. 20, 1995 [DE] Germany ............ 195 34 791.9

[51] Int. Cl.[6] ............ F16H 57/08; F16H 1/28; F16H 3/44
[52] U.S. Cl. ............ 475/159; 475/331
[58] Field of Search ............ 475/159, 331

[56] References Cited

U.S. PATENT DOCUMENTS 2,968,190  1/1961  Orr .
3,539,035  11/1970  Wolkenstein et al. .
5,643,126  7/1997  Hotta et al. ............ 475/159

FOREIGN PATENT DOCUMENTS

274874B1  3/1992  European Pat. Off. .
2652652C3  7/1980  Germany .

*Primary Examiner*—Dirk Wright
*Attorney, Agent, or Firm*—James J. Dottavio

[57] ABSTRACT

A planet gear carrier arrangement is provided for an automatic transmission having axial support. The planet carrier arrangement comprises a planet gear hub member, a plurality of planet gear pins carried by said hub member, a plurality of planet gears rotatably carried by said pins and an oil collecting ring carried by said hub member. The ring has formed at its inner circumference a truncated cone. The ring further has a thrust surface provided on a side of said ring axially opposite the hub member.

14 Claims, 1 Drawing Sheet

PLANET GEAR CARRIER ARRANGEMENT WITH AXIAL SUPPORT

BACKGROUND OF THE INVENTION

1. Field of the Invention

The invention relates to a planet gear carrier arrangement for use inside an automatic transmission.

2. Description of the Prior Art

It is known to use a planet gear carrier arrangement with axial support inside an automatic transmission. Such a planet gear carrier arrangement includes an axial needle bearing axially adjacent to the planet gear carrier. Additionally, a thrust washer lies directly up against the planet gear carrier.

From German patent specification 36 52 652, planet gear carrier arrangements are known on which an oil collecting ring is secured in position on the planet gear carrier. This collecting ring is formed at its inner circumference as a truncated cone, thus supplying lubricating oil to the planet gear pins. Further, the oil collecting ring forms an axial securing means for the planet gear pins.

From European specification 0 274 874, another planet gear carrier arrangement is known in which an oil collecting ring is secured in position on the planet carrier. This oil collecting ring is formed at its inner circumference as a truncated cone to supply lubricating oil to the hollow planet pins. Furthermore, the oil collecting ring forms an axial securing means for the planet gear pins in the manner of a bayonet joint.

Known planet carrier arrangements preclude the placement of a thrust washer on a needle bearing adjacent the oil collecting ring due to the manner in which the oil collecting ring is secured to the planet gear carrier. Axial support of the planet gear carrier must therefore be provided at another position. The present invention seeks to resolve this need for both an oil collecting ring and axial support.

SUMMARY OF THE INVENTION

It is an object of the present invention to provide a planet gear carrier arrangement with axial support having an oil collecting ring secured in position directly on the planet carrier wherein both the axial support and the supply of lubricating oil are ensured with the least possible constructional cost. This object is achieved if the oil collecting ring is formed directly by the thrust washer of the adjacent needle bearing. In addition, this collecting ring has a polygonal outer circumference which is accommodated in a recess having a corresponding polygonal form in the planet carrier hub member. The collecting ring is secured in position in corner regions of the polygonal recess by caulking. This enables the oil collecting ring to be secured in position on the planet carrier so that its middle region can directly perform the function of the thrust washer for the adjacent needle bearing. The inner circumference of the thrust washer can still be formed as a truncated cone in the known manner, thus ensuring a reliable supply of lubricating oil to the hollow planet gear pins.

In an embodiment of the invention, the oil collecting ring is hexagonal in shape and has tabs formed on two diametrically opposite sides which are accommodated in corresponding recesses in the planet gear carrier hub member.

DETAILED DESCRIPTION OF THE INVENTION

Figure 1:
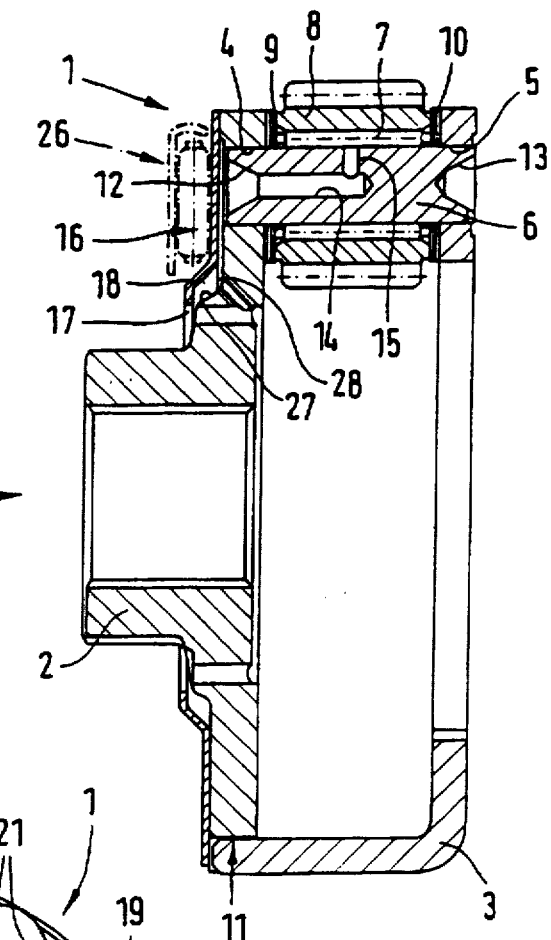
FIG. 1 is a section along the line I—I in FIG. 2 through a planet gear carrier arrangement in accordance with the invention.
Figure 2:
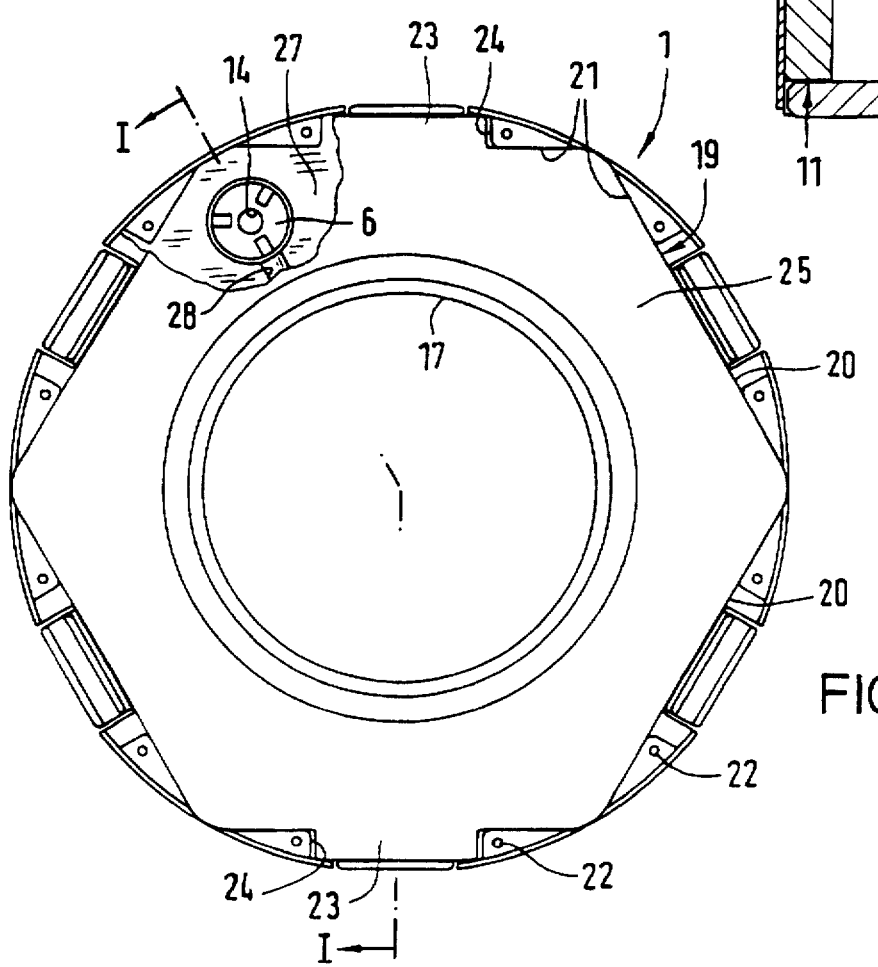
FIG. 2 is a view of the planet gear carrier arrangement of FIG. 1 in the direction of the arrow II.

The planet carrier arrangement 1 shown in FIGS. 1 and 2 consists of a planet gear carrier hub member 2 facing a planet gear carrier cage member 3. Cage member 3 accommodates a plurality of planet gear pins 6 in a plurality of bores 4 and 5 respectively. Planet gears 8 are rotatably mounted on gear pins 6 over needle bearings 7. Thrust washer arrangements 9 and 10 are provided in known manner; washer arrangement 9 is provided between the hub member 2 and the planet gears 8, and washer arrangement 10 is provided between the planet gears 8 and the cage member 3. The two components of the planet gear carrier, the hub member 2 and the cage member 3, may be in the form of an extrusion pressed or sintered member and of a sheet metal pressing, respectively.

These members are connected together in a suitable manner at 11 to form the planet gear carrier. The planet gear pins 6 have conical counterbores 12 and 13 by means of which they are secured in position in the bores 4 and 5 by radial expansion. From conical counterbore 12, an axial bore 14 extends to a radial bore 15 through which lubricating oil is fed to the needle bearing 7 of the planet gear 8. To supply lubricating oil, an oil collecting ring 16 is arranged on the planet gear carrier arrangement 1 on the side where the conical counterbore 12 merges into the axial bore 14. Moreover, axial bore 14 is formed at its inner circumference 17 as a truncated cone at 18.

The oil collecting ring 16 is formed at its outer circumference 19 as a polygon 20. Additionally, polygon 20 is accommodated in a recess 21 of similar polygonal shape in the planet gear carrier hub member 2. Recess 21 consists essentially of a plurality of triangular projections which are preferably deformed radially inwardly by caulking at 22. As a result, oil collecting ring 16 is held securely in position on the hub member 2.

In a preferred embodiment of the present invention, oil collecting ring 16 has a hexagonal shape. Oil collecting ring 16 can also be provided with tabs 23 on two diametrically opposite sides. These tabs 23 are accommodated in corresponding recesses 24 in the planet carrier hub member 2.

The middle region 25 of the oil collecting ring 16 substantially covers the planet gear pins 6 and preferably simultaneously forms the thrust washer for the adjacent needle bearing 26, as indicated in phantom lines. Alternatively, the middle region 25 may serve as a thrust surface for an annular thrust bearing (not shown). To ensure a reliable supply of lubricating oil to the hollow planet pins 6 at all times, radial passages 28 are formed on the outer side 27 of the hub member 2. These passages 28 lead to the bores 4 for the planet gear pins 6.

Axial needle bearing thrust washers have been used previously in the region which lies immediately against the outer side of the hub member, which is interrupted by the bores of the planet pins 6. It is known that, despite the non-planar nature of the support given the thrust washer of the axial needle bearing, no adverse effects on the life of the needle bearing should be realised.

Although the preferred embodiments of the present invention have been disclosed, various changes and modifications may be made without departing from the scope of the invention as set forth in the appended claims.

We claim:

1. A planet gear carrier arrangement for an automatic transmission, said carrier having axial support, comprising:
   a planet gear hub member;
   a plurality of planet gear pins carried by said hub member;
   a plurality of planet gears rotatably carried by said pins;
   an oil collecting ring carried by said hub member, said ring having formed at its inner circumference a truncated cone and said ring having a thrust surface provided on a side of said ring axially opposite said hub member, and
   wherein said thrust surface comprises a race of a thrust bearing axially adjacent said hub member.

2. The planet gear carrier arrangement of claim 1 wherein said thrust bearing comprises a needle bearing.

3. A planet gear carrier arrangement for an automatic transmission, said carrier having axial support, comprising:
   a planet gear hub member;
   a plurality of planet gear pins carried by said hub member;
   a plurality of planet gears rotatably carried by said pins;
   an oil collecting ring carried by said hub member, said ring having formed at its inner circumference a truncated cone and said ring having a thrust surface provided on a side of said ring axially opposite said hub member,
   said oil collecting ring comprises a polygonal shape at its outer circumference; and
   said planet gear carrier hub member further comprises a recess having a polygonal form corresponding to said oil collecting ring for securing said oil collecting ring on said hub member.

4. The planet gear carrier arrangement of claim 3 further comprising a plurality of triangular projections in said recess which deform radially inwardly by caulking to hold said oil collecting ring securely on said gear carrier hub member.

5. The planet gear carrier arrangement of claim 4 further comprising:
   said oil collecting ring having tabs formed on diametrically opposite sides thereof; and
   said hub member having recesses in registration with said tabs.

6. The planet gear carrier arrangement of claim 5 wherein said oil collecting ring comprises a ring having hexagonal outer circumference.

7. The planet gear carrier arrangement of claim 6 further comprising said hub member having a plurality of radial passages adjacent said ring, said passages providing a conduit for oil to travel to said planet gear pins.

8. The planet gear carrier arrangement of claim 7 further comprising said planet gear pins having an axial bore and a radial bore for communicating oil between said hub member and said planet gears.

9. The planet gear carrier arrangement of claim 8 wherein said ring further comprises a race of a thrust needle bearing axially adjacent said hub member.

10. A planet gear carrier arrangement with axial support comprising:
    a planet gear carrier hub member;
    a plurality of hollow pins supported by said hub member;
    a plurality of planetary gears supported by said pins; and
    a thrust bearing axially supporting said hub member, said thrust bearing including a race secured to said hub member, said race comprising an oil collecting ring having formed at its inner circumference a truncated cone.

11. A planet gear carrier arrangement according to claim 10, further comprising:
    said oil collecting ring having a polygonal outer circumference; and
    said hub member having a polygonal recess in registration with the ring, wherein said ring is secured to said hub in corner regions of the polygonal recess by caulking.

12. A planet carrier arrangement as claimed in claim 11, further comprising:
    said oil collecting ring having a hexagonal shape with tabs formed on two diametrically opposite sides;
    said hub having recesses in registration with said tabs.

13. A planet gear carrier arrangement according to claim 12 wherein the planet gear carrier hub member comprises a plurality of radial passages providing oil communication with said planet gear pins.

14. A planet gear carrier arrangement according to claim 13 wherein the thrust washer comprises a needle bearing.

* * * * *